United States Patent
Kato et al.

[11] Patent Number: 6,160,915
[45] Date of Patent: *Dec. 12, 2000

[54] CODED SIGNAL TRANSMISSION METHOD AND APPARATUS

[75] Inventors: Motoki Kato; Hideki Koyanagi, both of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/958,589

[22] Filed: Oct. 29, 1997

[30] Foreign Application Priority Data

Nov. 7, 1996 [JP] Japan .................................. 8-295477

[51] Int. Cl.$^7$ .................................................. G06K 9/36
[52] U.S. Cl. ............................ 382/232; 382/239; 348/446
[58] Field of Search ................................. 382/232, 239; 348/446, 404, 403

[56] References Cited

U.S. PATENT DOCUMENTS

| | | | |
|---|---|---|---|
| 5,510,906 | 4/1996 | Yagasaki et al. | 358/342 |
| 5,686,963 | 11/1997 | Uz et al. | 348/404 |
| 5,771,316 | 6/1998 | Uz | 382/239 |
| 5,771,357 | 6/1998 | Kato et al. | 395/200.77 |
| 5,774,206 | 6/1998 | Wasserman et al. | 395/200.77 |
| 5,864,368 | 1/1999 | Kato et al. | 348/446 |

OTHER PUBLICATIONS

International Standard, ISO/IEC 11172–2, First Edition, Aug. 1, 1993, Annex C, "Information Technology—Coding of Moving Pictures and Associated Audio for Digital Storage Media at up to About 1,5 MBIT/S—Part 2: Video".

International Standard, ISO/IEC 13818–2, First Edition, May 15, 1996, Annex C, "Information Technology—Generic Coding of Moving Pictures and Associated Audio Information: Video".

U.S. application No. 08/958,569, filed Oct. 28, 1997.
U.S. application No. 08/167,415, filed Dec. 14, 1993.

*Primary Examiner*—Jose L. Couso
*Assistant Examiner*—Anh Hong Do
*Attorney, Agent, or Firm*—Limbach & Limbach L.L.P.; Seong-Kun Oh

[57] ABSTRACT

The present invention enables a stable signal reproduction without overflow or underflow of a buffer in a decoder system even if a transmission bit rate is changed. In particular, when coding and transmitting a digital signal at a variable bit rate, a size of an encoder buffer for temporarily storing a coded signal in an encoder system is controlled according to a coding bit rate from a terminal. The encoder buffer has a code buffer to be used for rate control by the encoder system. The size of this code buffer is determined according to a reception buffer size of a decoder system supplied from a terminal, a maximum value of a coding bit rate supplied from a terminal, and a current bit rate.

27 Claims, 9 Drawing Sheets

CODED SIGNAL TRANSMISSION METHOD AND APPARATUS

BACKGROUND OF THE INVENTION

1. Field of the Invention

The present invention relates to a coded signal transmission method and apparatus which can be used for encoding a digital signal at a variable bit rate at a transmission side and transmitting the signal to a reception side.

2. Description of the Prior Art

For television broadcasting of the next generation, there is a plan for digitalizing animation signals for realizing transmission of animation signals of a high quality. Here, if an animation signal is directly digitized, there is generated a great amount of data. In order to transmit the digitized data through a limited transmission line with high efficiency, the data should be encoded (data compression).

In general, however, an animation is a dynamic image which changes according a time lapse. Moreover, within a single image, a picture movement may greatly differ in the center and in the periphery of the image. Thus, the data amount generated when encoded by an encoder varies depending on the property of the image. In order to transmit this data at a constant transmission bit rate, a transmission buffer is provided at the last stage of an encoder system. That is, The encoded data changing in the amount generated is temporarily stored in the transmission buffer, from where the data is read out at a predetermined transmission bit rate and output to a transmission line.

FIG. 1 is a block diagram of a conventional encoder (hereinafter, referred to as an encoder system) having a constant output bit rate. In this encoder system of FIG. 1, a transmission buffer (hereinafter, referred to as an encoder buffer) 13 is provided between a transmission line and a video encoder 12 which is supplied with a video input through a terminal 11, for controlling the smoothing of the fluctuation of the bit amounts generated in a short period of time from the video encoder 12 so that the encoder buffer 13 can output a bit stream at a constant bit rate.

A rate controller 15 is supplied with an encoded picture generation bit amount S21 from the video encoder 12, a bit rate R from a terminal 16, and a decoder buffer size B from a terminal 10, and calculates a bit amount S22 to be assigned for the following picture to be encoded so as not to overflow or underflow the decoder buffer of the aforementioned size B, for example, according to a VBV (Video Buffering Verifier) model which will be detailed later. Data on the bit amount S22 calculated is transmitted to the video encoder 12 for specification.

The encoder buffer 13 is supplied with a video bit stream from the video encoder 12 and has a code buffer at least equal to the decoder buffer size B. Normally, the code buffer is included in the transmission buffer.

The bit stream outputted from the encoder buffer 13 is supplied to a multiplexer 14. Although not depicted, the multiplexer 14 is also supplied with an encoded bit stream of an audio signal. In the multiplexer 14, a plurality of input bit streams are system-encoded and multiplexed, and the multiplexed stream is outputted from a terminal 17.

Note that a start of output of the bit stream from the encoder buffer is specified by a start controller 19. This is illustrated in FIG. 1 in such a configuration that the start controller 19 controls a switch 20 provided at the output side of the encoder buffer 13. The start time is calculated, as will be detailed later, according to the aforementioned bit rate R and a data supplied from a terminal 18 on bit occupation amount b0 at a decoding start moment of the decoder buffer.

FIG. 2 is a block diagram of a conventional decoder (hereinafter, referred to a decoder system). A demultiplexer 26 is supplied with the multiplexed stream from a terminal 25. The video stream which has been isolated by the demultiplexer 26 is stored in a reception buffer (hereinafter, referred to as a decoder buffer) 27. The decoder buffer 27 serves to absorb a fluctuation of the bit amount which is read out by the video decoder 28 during a short period of time. Because the decoder system is a passive system for the bit stream supplied, in order to enable stable video reproduction by the video decoder 28, the encoder system should carry out encoding while controlling not to cause overflow or underflow of the decoder buffer 27.

As a representative animation encoding method, there is known the MPEG standard. The MPEG is an abbreviation of the Moving Picture Coding Experts Group for examination of animation encoding for storage, which group belongs to the ISO/JTC1/SC29 (International Organization for Standardization/ International Electrotechnical Commission, Joint Technical Committee 1/ Sub Committee 29). The MPEG1 Standard is the ISO11172 and the MPEG2 Standard is the ISO13818. Among these international standards, ISO11172-1 and ISO13818-1 are items for multimedia multiplexing; ISO11172-2 and ISO13818-2 are items for images; and ISO11172-3 and ISO13818-3 are items for voice.

This MPEG standard assumes an ideal I/O model of the decoder buffer 27 of the decoder system, and specifies an encoder system which carries out encoding while controlling not to overflow or underflow the decoder buffer 27, assuming the decoder buffer model (an ideal model of the decoder buffer). The I/O model of the decoder buffer 27 of the decoder system is described as VBV (Video Buffering Verifier) in the ISO/IEC 11172-2 Annex C or ISO/IEC 13818-2 Annex C.

The VBV buffer size of the decoder system is specified by the identifier "vbv_buffer_size" in the MPEG bit stream. The typical size, for example, is 1.75M bits at MP@ (Main Profile at Main Level)

The VBV of the decoder system is assumed to operate under the following ideal condition.

(1) A bit stream corresponding to a picture is instantaneously outputted from the decoder buffer and each of the pictures is decoded instantaneously.

When a bit stream is transmitted at a real time from the encoder system to the decoder system under this condition, the transmission buffer (encoder buffer) of the encoder system should operate under the following ideal condition.

(2) Each of the pictures is encoded instantaneously and a bit stream for the corresponding picture is inputted instantaneously to the encoder buffer.

Explanation will be given on a VBV model in which an encoder system and a decoder system operate at a real time via a transmission line. Here, the encoder system outputs a bit stream at a constant bit rate from the encoder buffer 13 as has been explained with reference FIG. 1. Consequently, the bit stream is inputted at a constant bit rate to the decoder buffer 27 of FIG. 2.

FIG. 3 shows an example of changes of the bit occupation amount of the buffers in the encoder system and the decoder system according to the VBV mode. In this FIG. 3, a straight line c–d divides the encoder system and the decoder system. That is, the change of bit occupation amount in the decoder buffer is shown at the right side of line c–d, and the change of bit occupation amount in the encoder buffer is shown at the left side of the line c–d.

The two of the horizontal axes t represent the time lapses: the upper time axis represents a time lapse in the encoder system and the lower time axis represents a time lapse in the decoder system. For simplification, the line c–d is shared by the encoder system and the decoder system as if there were no time difference between them. However, there exists a certain transmission line delay time D0 between the encoder system and the decoder system. Consequently, the time at point c which is the origin t=0 on the time axis of the encoder system becomes t=D0 on the time axis of the decoder system. The D0 includes the processing time of the multiplexer 14 in the encoder system, the transmission time, and the processing time of the demultiplexer 26 in the decoder system.

The vertical axis represents, in the encoder system, the accumulated bit amount of the bit stream outputted from the encoder buffer at a particular time, and in the decoder system, the accumulated bit amount of the bit stream inputted to the decoder buffer at a particular time.

The slope of the line c–d ($\Delta d/\Delta t$) can be viewed from the encoder system as a constant output bit rate R from the encoder buffer 13 and from the decoder system as a constant input rate R to the decoder buffer 27.

The vertical distance between the line c–d and the line e–f along the vertical axis represents a size B of the decoder buffer. The vertical distance between the line c–d and the line a–b represents a size B of the encoder buffer. The B is a constant value. The size of the encoder system is always identical to the size of the decoder system.

The A(n) represents an n-th coded picture, and its size represents the bit amount of the coded picture. As shown in FIG. 4, each of the pictures is encoded as an I picture, P picture, or B picture. The I picture is encoded by using its own image signal alone. The P picture is motion-compensative-predicted from an I picture or P picture immediately before and the prediction residue is coded. The B picture is motion-compensative-predicted from an I picture or P picture immediately before and immediately after, and the prediction residue is coded. The bit amount of each coded picture A(n) changes according to the picture type I, P, or B and the picture content.

Referring back to FIG. 3, the ETS(n) represents a time to encode the coded picture A(n). The interval of pictures to be encoded (i.e., ETS(n+1) –ETS(n)) is, for example, 1/29.97 seconds in the NTSC video signal, and 1/25 seconds in the PAL video signal. The DTS(n) represents a time to decode the n-th coded picture A(n). The interval of pictures to be decoded (i.e., DTS(n+1)–DTS(n)) is identical to the interval of pictures to be encoded.

In the encoder system, the region below the stepped zigzag trace in the figure represents the bit occupation amount change in the encode buffer. That is, the vertical distance from the time t on the line c–d to the stepped trace represents the bit occupation amount at time t. The vertical direction movement of the stepped trace represents an instantaneous input of a bit stream from the video encoder 12 to the encoder buffer 13, whereas the horizontal direction movement of the stepped trace indicates that no bit stream is inputted from the video encoder 12 to the encoder buffer 13 (no encoding is carried out), and the encoder buffer 13 outputs a bit stream at the bit rate R.

Description will now be directed to the change of the bit occupation amount in the encoder buffer of the encoder system.

Before time t=ETS(0), the bit occupation amount in the encoder buffer is zero. A data of the 0-th picture A(0) encoded at time t=ETS(0) is instantaneously inputted to the encoder buffer, which instantaneously increases the bit occupation amount of the encoder buffer by the bit amount of the aforementioned 0-th coded picture A(0). The encoder buffer starts output of a bit stream at t=0. The start is specified by the start controller 19 in the encoder system shown in FIG. 4. This start time do is calculated from the bit rate R and the bit occupation amount b0 at the decoding start of the decoder buffer as follows.

$$ETS(0)+do=0$$

$$do=(B-b0)/R$$

For the time duration from t=0 to the encoding time ETS(1) of the next 1-st picture A(1), a bit stream is outputted from the encoder buffer at the bit rate R, which decreases the bit occupation amount of the encoder buffer as the time lapses. At the encoding time ETS(1), the 1-st picture A(1) is encoded and supplied to the encoder buffer, which instantaneously increases the bit occupation amount of the encoder buffer by the bit amount of the 1-st picture A(1). For the time duration from t=ETS(1) to ETS(2), a bit stream is outputted from the encoder buffer at the bit rate R, which decreases the bit occupation amount of the encoder buffer as the time lapses. In the same manner, picture encoding is continued at a predetermined time interval.

The bit occupation amount in the decoder buffer is changed according to the bit occupation amount change of the aforementioned encoder buffer. In the decoder system, the region above the stepped trace represents the bit occupation amount change. That is, the vertical distance from the time t on the line c–d to the stepped trace along the vertical axis represents the bit occupation amount of the decoder buffer at time t. The vertical direction movement of the stepped trace represents that the video decoder 28 instantaneously reads out a bit stream from the decoder buffer 27, whereas the horizontal direction movement of the stepped trace represents that the video decoder 28 reads out no bit stream from the decoder buffer 27 (no decoding is carried out) and a bit stream is inputted to this decoder buffer 27 at the bit rate R.

Description will now be directed to the change of the bit occupation amount of the decoder buffer in the decoder system.

At time t=D0, input of a bit stream to the decoder buffer at the bit rate R is started. When the time duration di, i.e., $$di=b0/R$$

has elapsed, at time DTS (0), the 0-th picture A(0) is decoded

This moment of time di or time DTS(0) is specified by the bit stream received. The bit occupation amount of the decoder buffer is instantaneously decreased by decoding the 0-th coded picture A(0) at time DTS by the bit amount of the aforementioned 0-th coded picture A(0). Subsequently, during a following time duration up to the time DTS(1), a bit stream is inputted to the decoder buffer at the bit rate R, which increases the bit occupation amount of the decoder buffer as the time lapses. At time DTS(1), the 1-st coded picture A(1) is decoded, which instantaneously decreases the bit occupation amount of the decoder buffer by the bit amount of the 1-st coded picture A(1). In the same manner, picture decoding is continued at a predetermined time interval.

Here, T(i) represents a time interval (hereinafter, T will be referred to as a delay time) from the time ETS(i) when the i-th coded picture A(i) is encoded to the time DES(i) when the i-th coded picture A(i) is decoded. That is, $$T(i)=DTS(i)-ETS(i)$$

In order to carry out a stable image reproduction at the side of decoder (reception) system, the aforementioned delay time T(i) should be a constant value for encoding/decoding of all the coded pictures. That is, $$T=T(0)=T(1)=\ldots=T(n)$$

Consequently, as shown in FIG. 3, the trace of the bit occupation amount of the decoder buffer is identical to the trace of the bit occupation amount of the encoder buffer which trace is advanced by the aforementioned delay time T (rightward along the horizontal axis).

Here, if it is assumed that B is the aforementioned buffer size, Oe(n) is the bit occupation amount of the encoder buffer immediately before encoding the n-th coded picture A(n), Ve(n) is the vacancy amount of the encoder buffer immediately before encoding the n-th coded picture A(n), Od(n) is the bit occupation amount of the decoder buffer immediately before decoding the n-th coded picture A(n), and Vd(n) is the vacancy amount of the decoder buffer immediately before decoding the n-th coded picture A(n), then the following relationships are satisfied.

$$Ve(n)=B-Oe(n)$$

$$Vd(n)=B-Od(n)$$

$$Oe(n)=Vd(n)$$

$$Ve(n)=Od(n)$$

$$B=Oe(n)+Ve(n)=Od(n)+Vd(n)=Oe(n)+Od(n)$$

That is, as shown in FIG. 5, control is carried out so that the sum of the bit occupation amount of the encoder buffer in the encoder system and the bit occupation amount of the VBV buffer (decoder buffer) of the decoder system be a constant value (corresponding to the buffer size B) via the aforementioned delay time T.

The delay time T is calculated by the following equation.

$$T=\tau e(n)+\tau d(n)+D0$$
$$=Oe(n)/R+Od(n)/R+D0$$
$$=B/R+D0$$

wherein D0 represents a transmission line delay amount (constant).

If "t" is assumed to be a period of time required for making the bit occupation amount of the encoder buffer from the aforementioned buffer size B to 0 at the output bit rate R or a period of time required for making the bit occupation amount of the decoder buffer from 0 to B at the input bit rate R, then the following relationships are satisfied.

$$\tau=B/R=\tau e(n)+\tau d(n) \quad \text{(constant)}$$

$$T=\tau+d0 \quad \text{(constant)}$$

Assuming this buffer model, the encoder system should carry out encoding and transmission, while taking consideration not to overflow or underflow the decoder buffer of the decoder system. The decoder system can carry out a stable picture decoding while the stepped trace of the decoder system is found between the line c–d and the line e–f without exceeding the buffer size B. If the stepped trace is found above the line c–d, it means that the decoder buffer is underflown, and if the stepped trace is below the line e–f, then it means that the decoder buffer is overflown.

The encoder system encodes an n-th picture A(k), assuming the bit occupation amount of the decoder buffer when the picture A(k) is decoded. Here, the k-th picture A(k) can generate a bit amount which satisfies the following condition.

[Equation 1]

R and B are constant when t>D0

If k=0, $$Od(0)=b0 \quad (1)$$

If $k \geq 1$, $$Od(k) = b0 + (DTS(k) - DTS(0)) \times R - \sum_{i=0}^{k-1} A(i) \quad (2)$$

$$Od(k)+R\times(DTS(k+1)-DTS(k))-B \leq A(k) \leq Od(k) \quad (3)$$

wherein $A(k) \geq 0$

In the encoder system of FIG. 1, the bit amount of the picture A(i) when i<k corresponds to the bit amount S21 generated from the aforementioned video encoder 12. The rate controller 15, assuming the bit amount S22 to be assigned for the k-th picture A(k), specifies a value of the bit amount (size of the picture A(k)) which satisfies the aforementioned equation (3). The encoder system carries out such a control so as not to overflow or underflow the decoder buffer of the decoder system.

In the conventional technique as has thus far been described, there is no problem as long as the data transmission rate between the encoder system and the decoder system is a constant rate. However, if the data transmission is carried out at a variable bit rate, there arises a problem that the decoder system cannot obtain a stable picture reproduction. This problem will be detailed below with reference to FIG. 6.

Here, in the same way as the aforementioned conventional technique, the size of the encoder buffer of the encoder system is a constant and identical to the size B of the VBV buffer (decoder buffer) of the decoder system.

For transmission at a variable bit rate, for example, if the coding bit rate is changed from R1 to R2 when encoding the n-th picture A(n) and after, then, in synchronization with this, the encoder system changes the output bit rate R from the encoder buffer from R1 to R2. This change of the output bit rate R from the encoder buffer is shown in FIG. 6 as a change of the slope of line e–f to line f–g at time t=ETS(n). That is, the aforementioned output bit rate R and the coding bit rates R1 and R2 are in the relationships as follows.

$$R=R1: 0 \leq t < ETS(n)$$
$$R=R2: ETS(n) \leq t$$

wherein R1>R2

In this case, the encoder system, according to the aforementioned equations (1), (2), and (3), assumes that the possible trace of bit occupation amount of the VBV buffer of the decoder system is found between the broken line e–f–p–q and the broken line h–i–r, and the encoder system is assumed to have carried out an encoding so that the trace of the bit occupation amount of the encoder buffer is found between the broken line e–f–g and the broken line a–b–d.

In this case, as is clear from FIG. 6, there arises an underflow of the decoder buffer when decoding the n-th picture A(n).

This is because, in the case of FIG. 6, the time interval between the moment of encoding of a picture and the moment of decoding to the picture is changed when the output bit rate R is changed from the coding bit rate R1 to the bit rate R2. That is, if T1 is assumed to be the time interval while R=R1, and T2 is assumed to be the time interval while R=R2, then B=Oe(1)+Od(1) Oe(n)+Od(n)(Oe(n)=0 in FIG. 9)

When R=R1: T1=Oe(1)/R1+Od(1)/R1+D0+B/R1+D0.

When R=R2: T2=Oe(n)/R2+Od(n)/R2+D0+B/R2+D0.

Note that D0 is a transmission line delay time (constant) and R1>R2. Consequently, T1<T2.

As can be understood from FIG. 6, in the decoder system, for the pictures A(0) to the (n−1)-th picture A(n−1), the time interval T1 between encoding a picture and decoding of the picture is unchanged, and a stable decoding can be carried out.

A problem arises when decoding the picture A(n). That is, when decoding the picture A(n), the picture A(n) has not yet completely arrived at the decoder buffer at time t=(ETS(n)+T1), and an underflow is caused. At time t=(ETS(n)+T1) in FIG. 6, the trace X shows that the decoder buffer is underflown when decoding the picture A(n). The moment of time when the picture A(n) can be correctly decoded is time t=DTS(n)=ETS(n)+T2. Thus, during the time interval F from t=(ETS(n)+T1) to t=DTS(n), decoding cannot be carried out normally and accordingly, there arises a problem in image display. That is, for example, during this time interval, the picture A(n−1) which has bee decoded immediately before continues to be displayed, i.e., the display is frozen (still).

SUMMARY OF THE INVENTION

It is therefore an object of the present invention to provide a coded signal transmission method and apparatus in which a digital signal is coded at a variable rate in an encoder system (transmission side) and is transmitted to a decoder system (reception side) at a variable bit rate while controlling so as not to overflow or underflow a decoder buffer of the decoder system.

In order to achieve the above object, when coding at a variable bit rate and transmitting at real time to a reception side (decoder system), it is necessary that a time interval from a moment of encoding of a picture to a moment of decoding of the picture be a constant value for all of the pictures involved.

In the coded signal transmission method according to the present invention, for coding a digital signal at a variable bit for transmission, a size of a transmission buffer is controlled according to a coding bit rate for temporarily storing a coded signal in the encoder system for transmission at a variable rate.

Accordingly, there is provided a code buffer which is included in the transmission buffer of the encoder system and which can be used for rate control by the encoder system is changed in size according to the coding bit rate.

More specifically, the coded buffer size which can currently be used by the encoder system is determined by the reception buffer size of the decoder system, the maximum value of the coding bit rate, and the current coding bit rate.

If it is assumed that Bmax is the reception buffer size of the decoder system, Rmax is the maximum value of the coding bit rate, and RT is the current coding bit rate, the code buffer size B of the transmission buffer is determined as follows.

B=Bmax×RT/Rmax

Here, the switching time of code buffer size of the transmission buffer is assumed to be (β−τ) wherein β is a time when the coding bit rate changes and τ is a value obtained as follows:

T=Bmax/Rmax

It should be noted that in case when the decoder system of the reception side is based on the ISO/IEC 11172-2 or ISO/IEC 13818-2 (MPEG1 or MPEG2), the encoder system assumes the reception buffer of the decoder system to be a VBV (Video Buffering Verifier) buffer defined in the ISO/IEC 11172-2 Annex C or ISO-IEC 13818-2 Annex C. In this case, a code buffer size which can be used for rate control when encoding a picture is equal to the VBV buffer size required for decoding the picture, and an output bit rate of a coded picture from the encoder buffer is equal to the input bit rate of the picture to the VBV buffer.

The VBV buffer size of the decoder system and the input bit rate to the VBV buffer which are calculated in this manner are used for controlling a bit amount to be assigned for coding an input picture and a bit amount generated, thus enabling a stable image reproduction in the decoder system (reception side) without causing an overflow or an underflow.

DETAILED DESCRIPTION OF PREFERRED EMBODIMENTS

Description will now be directed to a coded signal transmission apparatus based on a coded signal transmission method according to an embodiment of the present invention with reference to the attached drawings. It should be noted that coding and transmission of a video signal will be explained according to the embodiment below. However, the present invention is not limited to a video signal but can be applied to an audio signal and the like.

Figure 7:
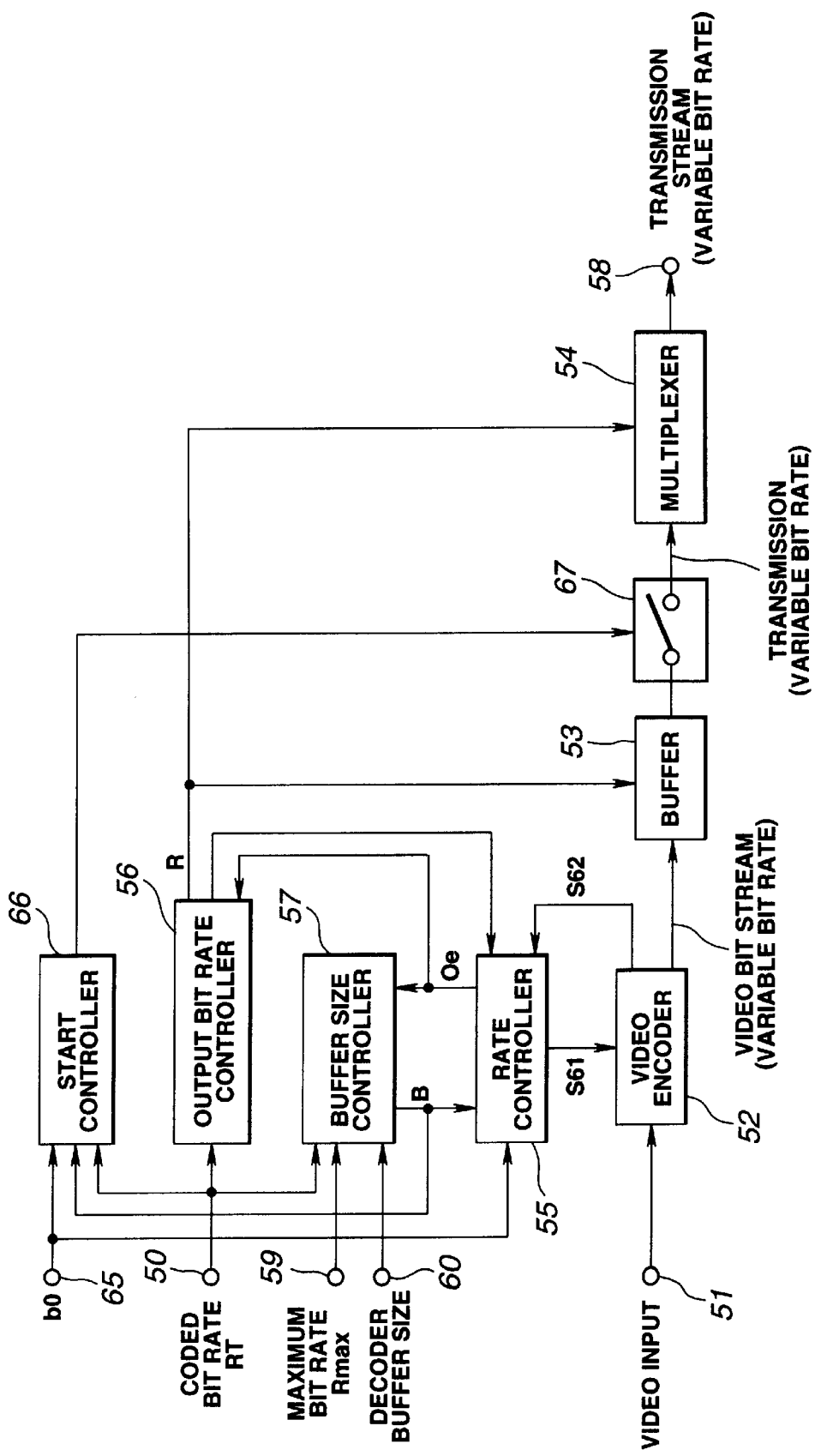
FIG. 7 is block diagram of an encoder system according to an embodiment of the present invention.

FIG. 7 is a block diagram of an encoder (hereinafter, referred to as an encoder system) according to one embodiment of the present invention.

In the encoder system of FIG. 7, an input video sequence is encoded at a variable bit rate, which is then outputted at a variable rate from an encoder buffer (transmission buffer) 53. There is a great difference between the conventional encoder system of FIG. 1 and the encoder system of FIG. 7 having the encoder buffer 53 controlled by an output bit rate controller 56 and a buffer size controller 57.

Figure 1:
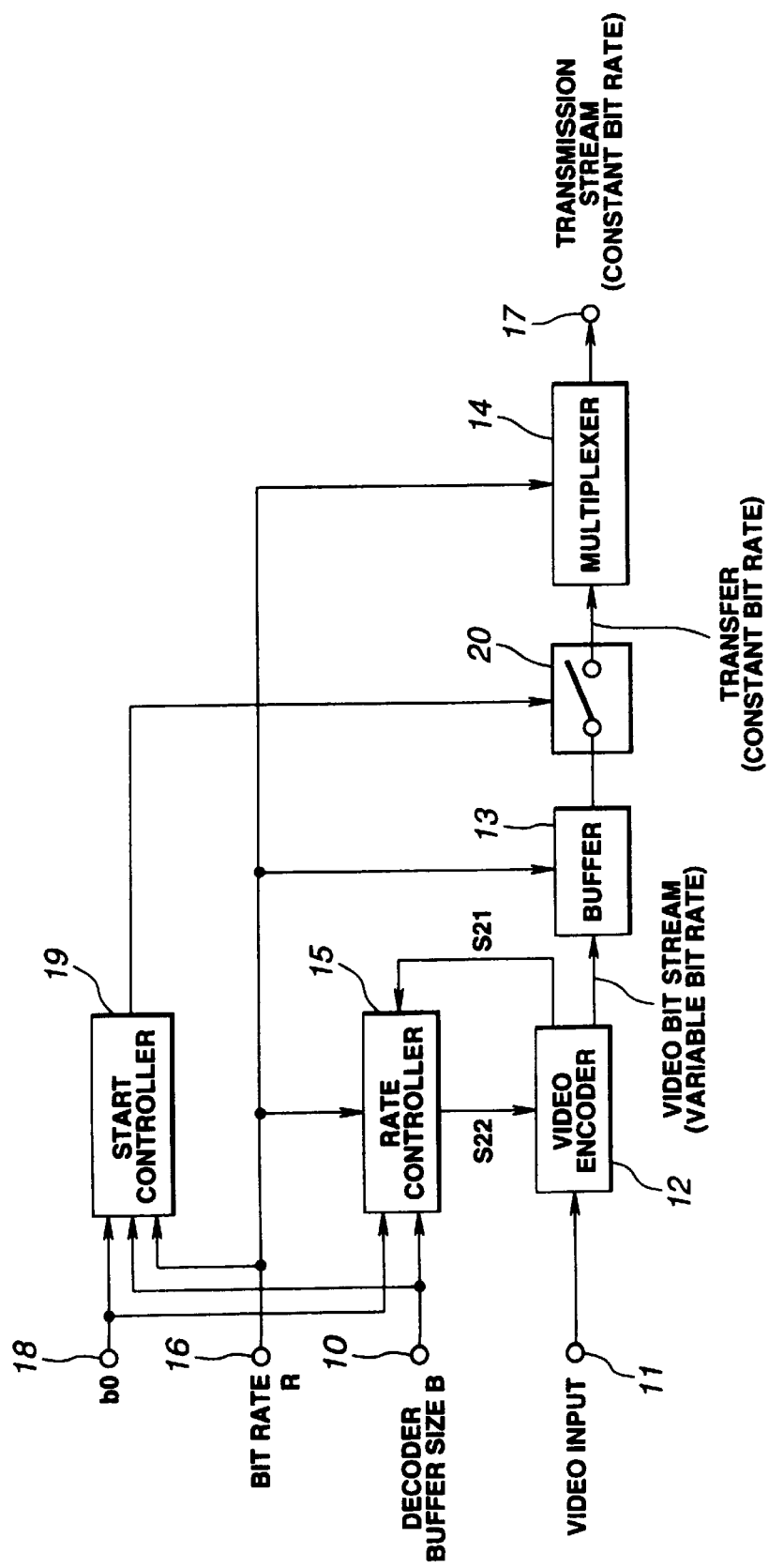
FIG. 1 is a block diagram showing a conventional encoder system for a constant output bit rate.

That is, in the encoder system of FIG. 1, the coding bit rate R specified from the terminal 16 serves as the output bit rate R from the encoder buffer 13. Moreover, in FIG. 1, the code buffer size which can be used by the encoder system is made always equal to the VBV buffer size of the decoder system.

On the other hand, in the encoder system according to the present invention shown in FIG. 7, the output bit rate controller (specifier) 56 controls the output bit rate R at a moment of time t and the buffer size controller (specifier) 57 controls the code buffer size B which can be used at moment of time t in the encoder system.

In the encoder system of FIG. 7, a video signal is inputted from a terminal 51 and the coding bit rate RT for a current input video can be specified from a terminal 50 at the will of a user. That is, the coding bit rate RT can be changed.

A video encoder 52 encodes a current input picture so as to satisfy an assigned bit amount S61 specified from a rate controller 55 and supplies a bit stream of the coded picture to the encoder buffer 53.

The rate controller 55 is supplied with a bit occupation amount b0 of the decoder buffer when starting decoding, bit amount S62 generated by a coded picture, an output bit rate R from the encoder buffer 53 specified from the output bit rate controller 56, and a buffer size B specified from the buffer size controller 57; and calculates an assigned bit amount S61 of a following picture to be coded, the result of which is supplied to the video encoder 52 so as not to overflow or underflow the VBV buffer (decoder buffer) of the decoder system by a method which will be detailed later.

In the same ways as the conventional technique explained with reference to FIG. 1, a start controller 66 specifies an output start of a bit stream from the encoder buffer 53.

The bit stream outputted from the encoder buffer 53 at the bit rate R is supplied to a multiplexer 54. Although not depicted, the multiplexer 54 is also supplied with a coded bit stream of an audio signal. The multiplexer 54 system codes and multiplexes a plurality of input bit streams, and outputs a multiplexed transmission stream from a terminal 58.

The rate controller 55 controls the coding bit rate in the video encoder 52; the output bit rate controller 56 controls the read-out rate from the encoder buffer 53; and the buffer size controller 57 controls the rate controller 55 so as to limit the size of the encoder buffer 53. These controllers 55, 56, and 57 will be detailed below.

Figure 8:
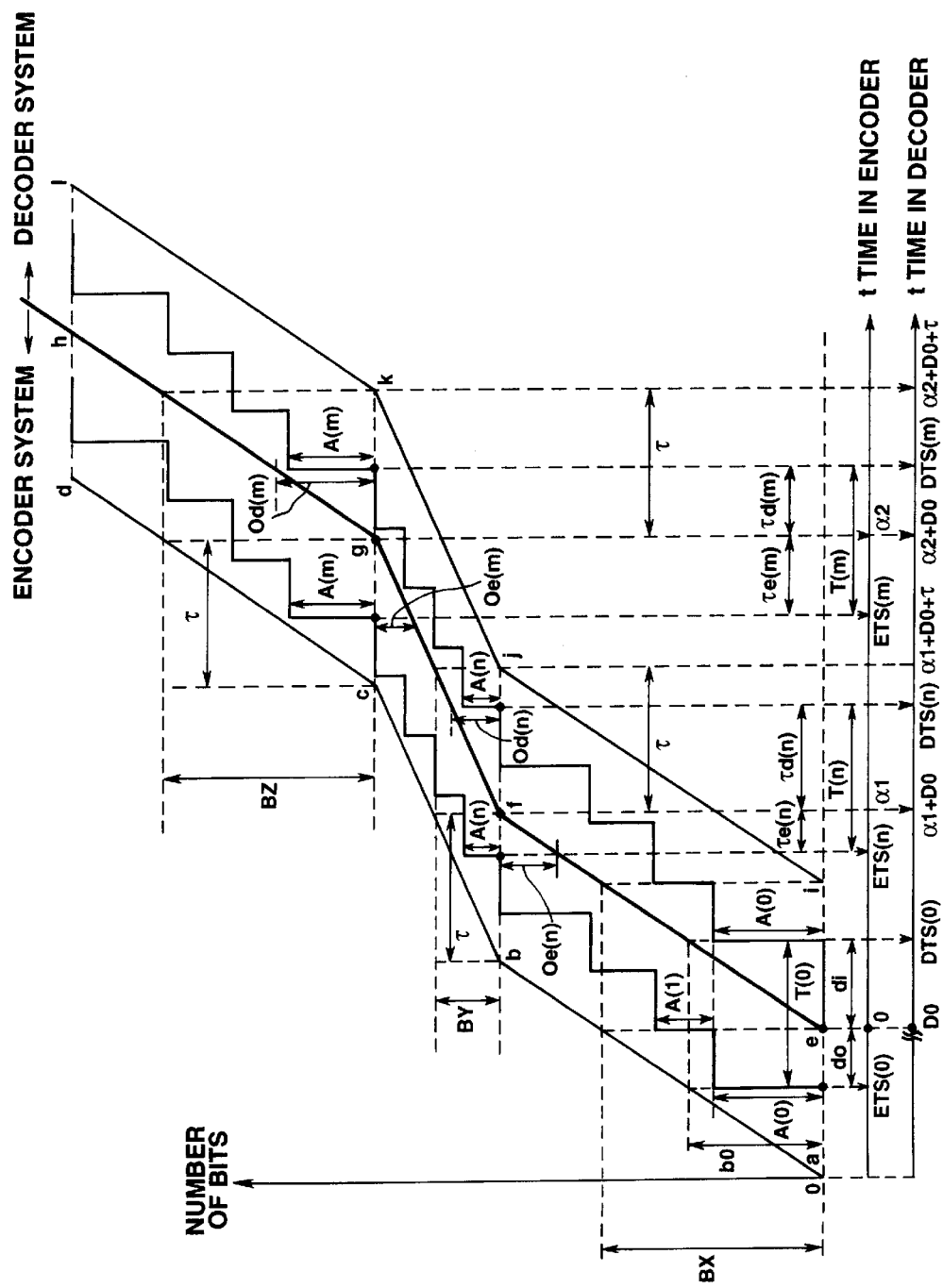
FIG. 8 shows the bit occupation amount change in a buffer of the encoder system and the bit occupation amount change in a buffer of the decoder system according to the embodiment.
Figure 9:
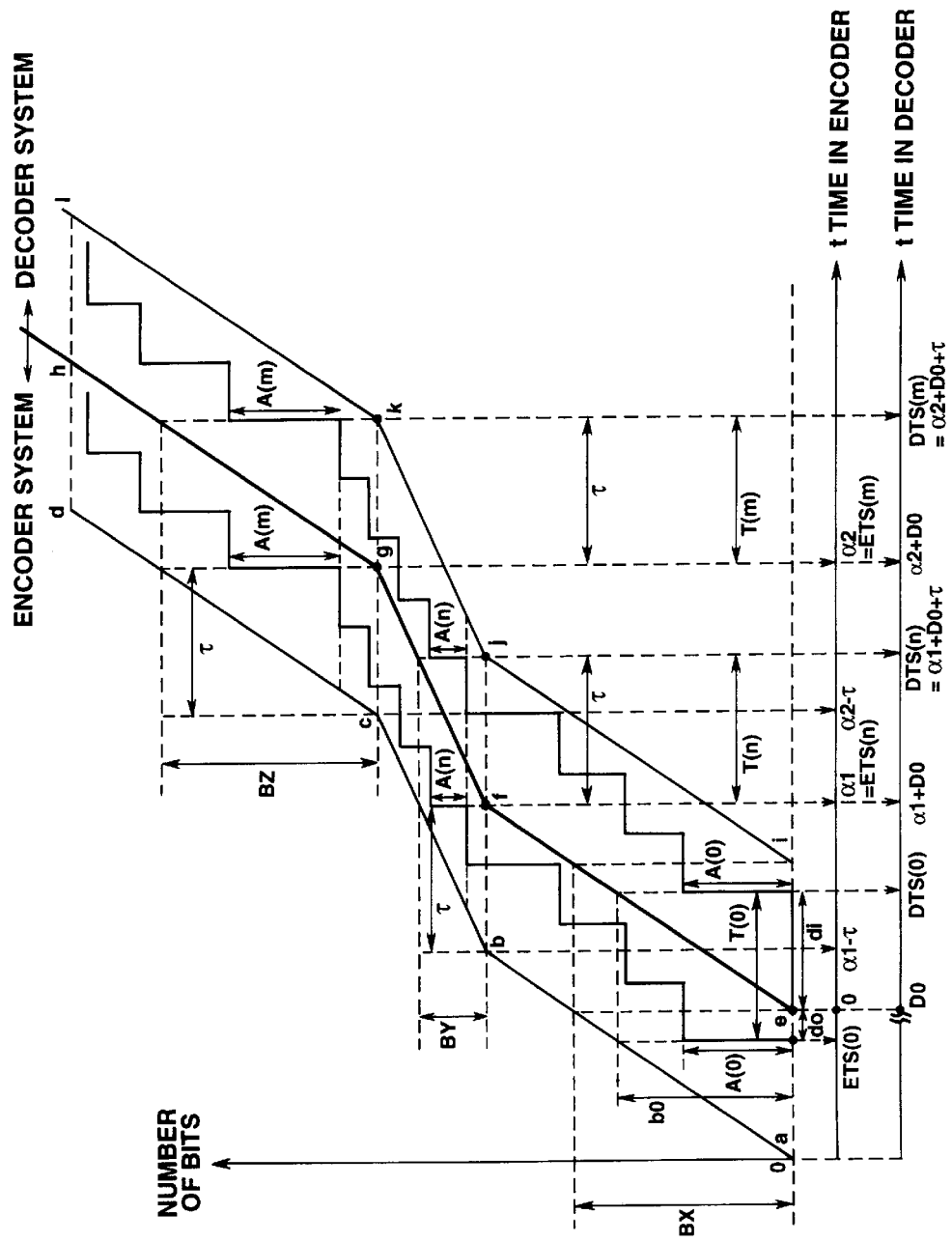
FIG. 9 shows the bit occupation amount change in a buffer of the encoder system and the bit occupation amount change in a buffer of the decoder system according to the embodiment.

FIG. 8 is a first example of a diagram showing the bit occupation change of the buffer in the encoder system and that of the decoder system according to the present embodiment. FIG. 9 is a second example of such a diagram according to the present invention. Note that, in these cases, the decoder system is assumed to be identical as the conventional one explained with reference to FIG. 2.

Figure 2:
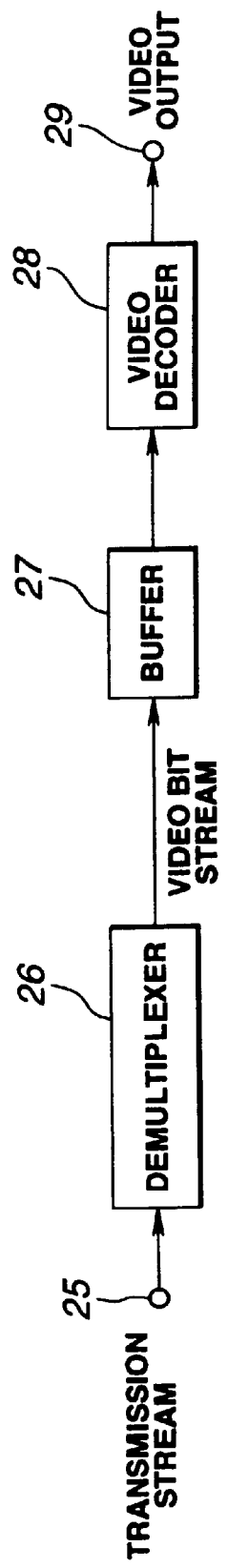
FIG. 2 is a block diagram showing a conventional decoder system.
Figure 3:
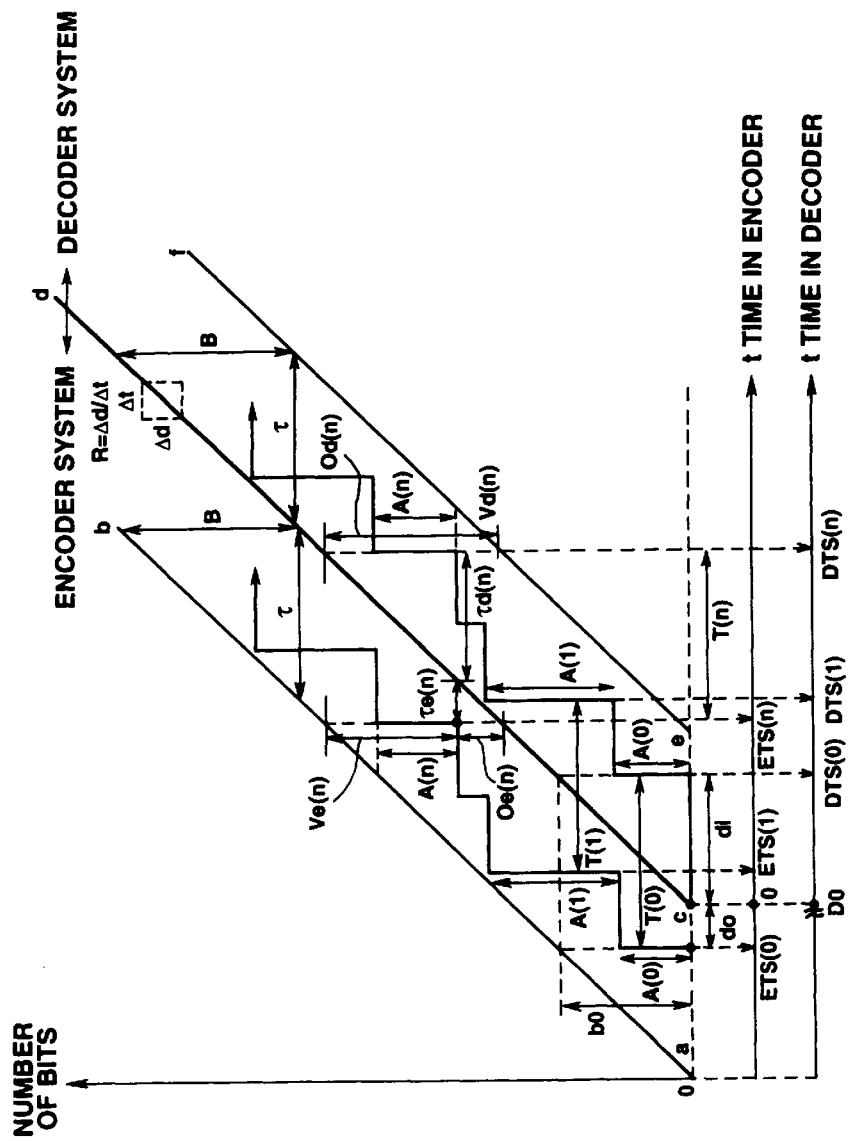
FIG. 3 shows bit occupation amount changes in the encoder system and the decoder system under a constant output bit rate.
Figure 4:
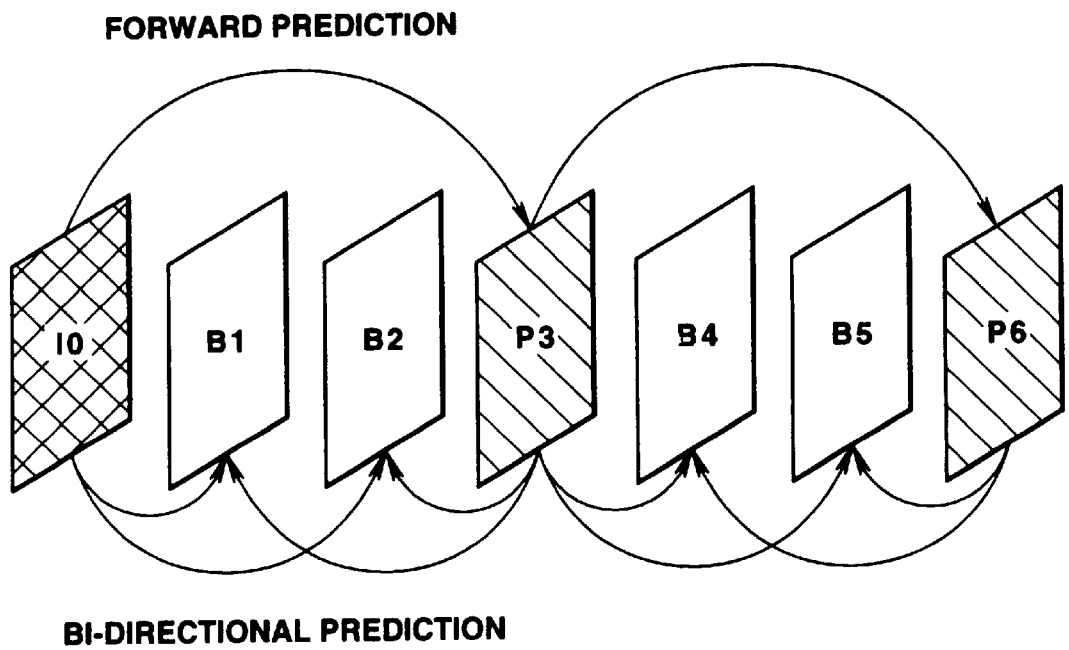
FIG. 4 shows picture types.
Figure 5:
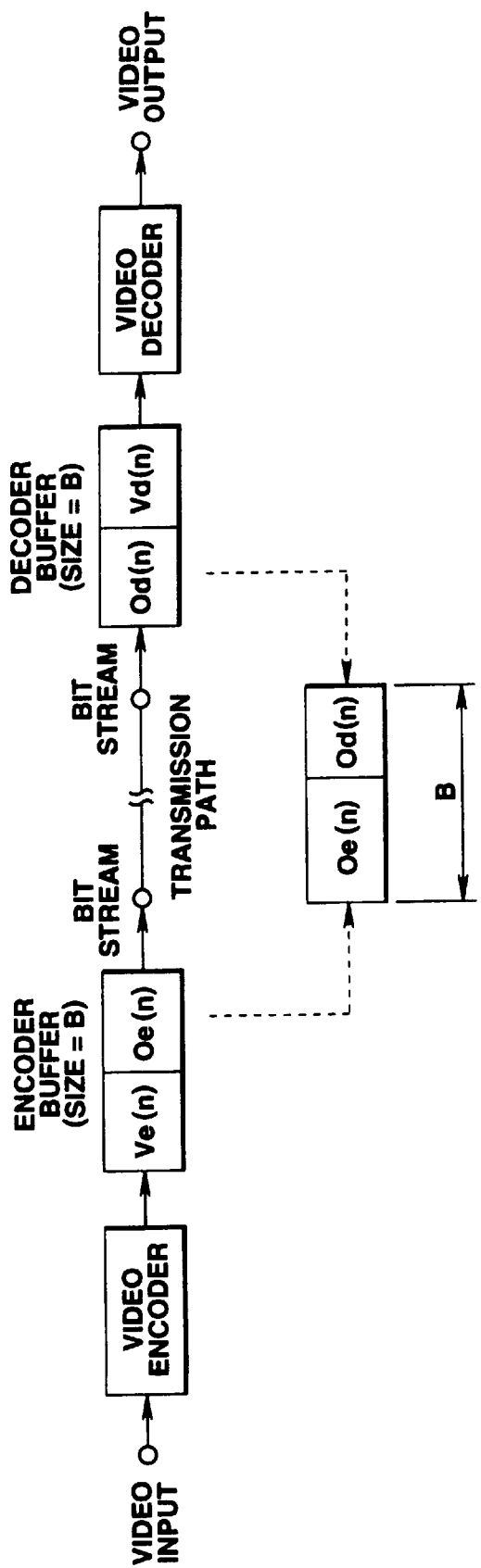
FIG. 5 shows the relationship between the bit occupation amount of the buffer of the encoder system and the bit occupation amount of the buffer of the decoder system.
Figure 6:
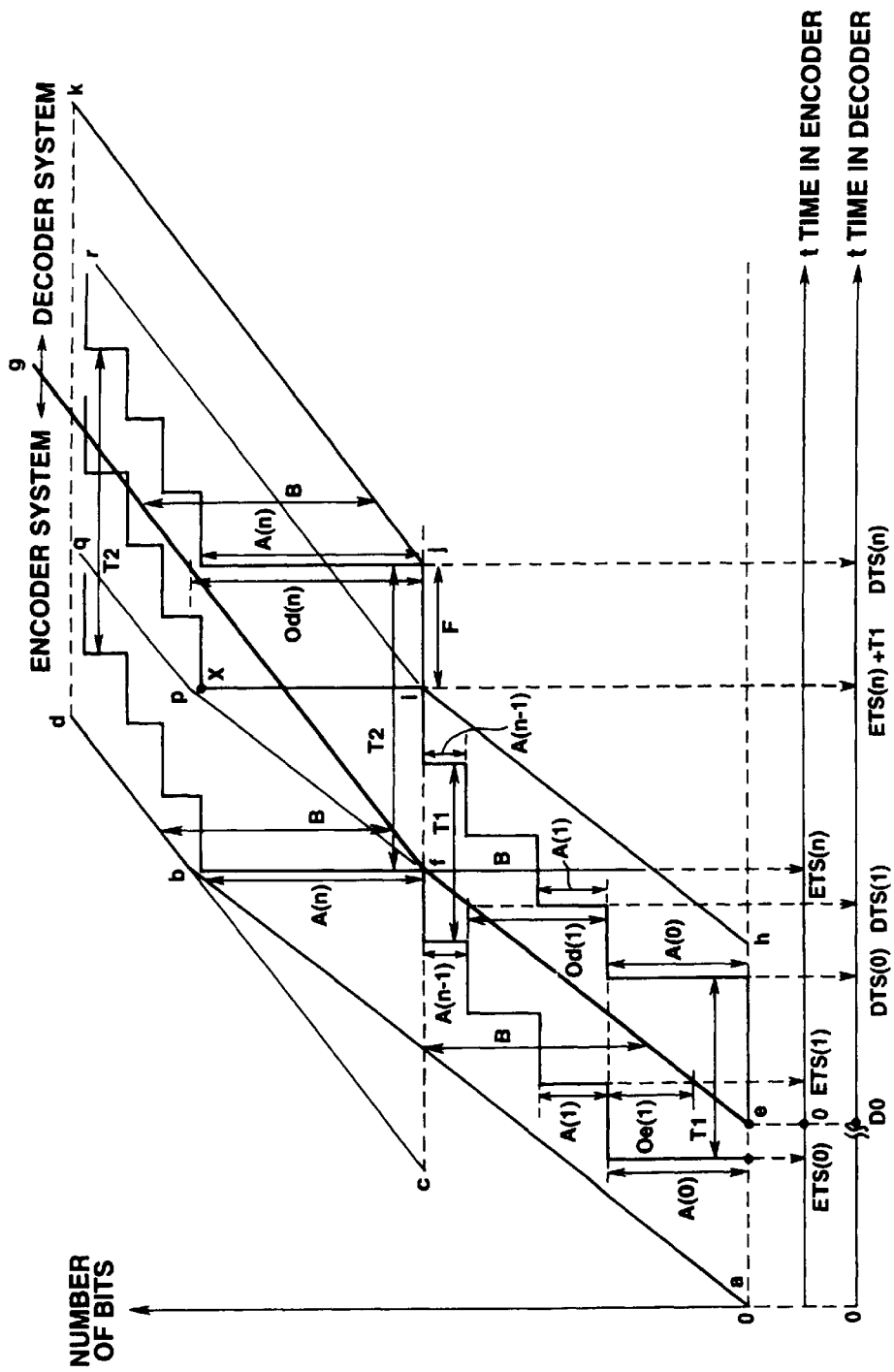
FIG. 6 shows a problem which occurs when the output bit rate is variable in the encoder system of FIG. 1.

In FIG. 2 and FIG. 3, the left side of the broken line e–f–g–h represents the bit occupation amount change in the encoder buffer 53 of the encoder system and the right side of this broken line represents the bit occupation amount change of the decoder buffer 27 of the decoder system.

The slope of the broken line e–f–g–h at a particular time t represents the bit rate R of the output from the encoder buffer 53 at time t and, if viewed from the decoder system, represents the bit rate R of the input to the decoder buffer 27 at time t.

The vertical distance between the broken line e–f–g–h and the broken line a–b–c–d represents the code buffer size B which can be used for the rate control by the encoder system at time t. The vertical distance between the broken line e–f–g–h and the broken line i–j–k–l represents the VBV buffer size B required at time t for the decoder system. The buffer size B which can be used at time t=ETS(i) by the encoder system is identical to the buffer size B required at t=DTS(i) for the decoder system.

The symbols D0, A(n), ETS(n), DTS(n), and T(n) have the same meaning as in the aforementioned FIG. 3. That is, D0 represents a constant transmission line delay time which exists between the encoder system and the decoder system. The A(n) represents the n-th coded picture and its size represents the bit amount of this n-th coded picture A(n). The ETS(n) represents the time to encode the n-th coded picture A(n). The DTS(n) represents the time to decode this n-th coded picture A(n). The T(n) represents the time interval between the time ETS(n) when the n-th coded picture A(n) is encoded and the time DTS(n) when this n-th coded picture A(n) is decoded.

Here, a case is considered when for an input video sequence, the coding bit rate RT is specified as follows.

RT=RX: a coding bit rate from the 0-th coded picture A(0) to the (n−1)-th coded picture A(n−1), wherein ETS(0) $\leq t <$ ETS(n).

RT=RY: a coding bit rate from the n-th coded picture A(n) to the (m−1)-th coded picture A(m−1), wherein ETS(n)$\leq t <$ETS(m).

RT=RZ: a coding bit rate from the m-t h coded picture A(m) and after, wherein ETS(m)$\leq t$.

The aforementioned coding bit rate RX, RY, and RZ are specified from the terminal 50 according to the input video signal from the terminal 51. In this example, the coding bit rate RX is the maximum bit rate and the following relation is assumed:

RX>RZ>RY

Here, T(i) represents the time interval from the time ETS(i) when the i-th coded picture A(i) is encoded to the time DTS(i) when this i-th coded picture A(i) is decoded, i.e., T(i)=DTS(i) ETS(i).

In order to obtain a stable image reproduction in the decoder system, the aforementioned time interval T(i) should be constant for the i-th coded picture, i.e., the following equation (1-1) should be satisfied for all the coded pictures.

$$T=T(0)=T(1)=\ldots=T(n) \qquad \text{Equation (1-1)}$$

Consequently, as shown in FIG. 8 and FIG. 9, the trace of the bit occupation amount of the decoder buffer should be identical to the trace of the bit occupation amount of the encoder buffer which has been advanced by time T (moved rightward along the horizontal axis in the figures). Hereinafter, explanation will be given how to determine the buffer size B and the output bit rate R in order to satisfy Equation (1-1).

In this example, the output bit rate R from the encoder buffer 53 is changed as follows:

R=RX: $0 \leq t < \alpha 1$

F=RY: $\alpha 1 \leq t < \alpha 2$

R=RZ: $\alpha 2 \leq t$

The procedure to determine the time a1 and the time $\alpha 2$ will be explained later.

The buffer size controller 57 determines a code buffer size B which can be used at time t by the encoder system according to the VBV buffer size of the decoder system, the maximum value of the coding bit; rate, and the coding bit rate RT at time t.

The buffer size B at time t=0, $\alpha 1$, and $\alpha 2$ will be explained. Here, it is assumed that:

B=BX: code buffer size of the encoder system at time t=0

B=BY: code buffer size of the encoder system at time t=$\alpha 1$

B=BZ: code buffer size of the encoder system at time t=$\alpha 2$

R=RX: output bit rate from the encoder buffer at time t=0

R=RY: output bit rate from the encoder buffer at time t=$\alpha 1$

R=RY: output bit rate from the encoder buffer at time t=$\alpha 2$

The BY and BZ can be calculated according to the encoder buffer size BX at the maximum bit rate RX. For example, the BX is assumed to be identical to the VBV buffer size of the decoder system and BX=1.75M bits At the respective output bit rates (RX, RY, RZ), a period of time $\tau$ required to make zero the bit occupation amount of the respective encoder buffers from the aforementioned BX, BY, and BZ. That is, the bit occupation amounts BY and BZ are determined as follows:

$\tau$=BX/RX=BY/RY=BZ/RZ        Equation (1-2)

That is,

BY=BX×RY/RX

BZ=BX×RZ/RX

Here, RX>RZ>RY. Therefore,

BX>BZ>BY

If the Equation (1-2) is satisfied for the buffer size B and the output bit rate R, then T=T($i$)=$\tau$+D0        (Constant)

$\tau$=Rmax/Bmax wherein

Bmax is the VBV buffer size of the decoder system, for example, 1.75M bits;

Rmax is the maximum value of the coding bit rate, i.e., RX in this example; and

D0 is the transmission line delay amount (constant).

Next, explanation will given on the values $\alpha 1$ and $\alpha 2$ and the buffer size B of the encoder system during the time intervals: $(\alpha 1-\tau) \leq t < \alpha 1$ and $(\alpha 2-\tau) \leq t < \alpha 2$.

Here, $\alpha 1$ and $\alpha 2$ are the moments of time when the output bit rate from the encoder buffer is changed. These moments of time $\alpha 1$ and $\alpha 2$ may be increased, allowing greater values than 0000000$\alpha 1+\Delta\tau$ and $\alpha 2+\Delta\tau (\Delta\tau \geq 0)$.

The output bit rate R from the encoder buffer is changed from RX to RY at t=$\alpha 1$ and from RY to RZ at t=$\alpha 2$.

The buffer size B is gradually reduced from BX to BY during the time interval $(\alpha 1-\tau) \leq t < \alpha 1$ and gradually increased from BY to BZ during the time interval (a2−t) <t<a2. In these time intervals, the buffer size B can be determined by one of the following two methods.

The first method can be employed in a case when a predetermined value is assumed for the bit occupation amount Oe(n) of the encoder buffer immediately before encoding a picture A(n) at time ETS(n) or the bit occupation amount Od(n) of the encoder buffer immediately before decoding a picture A(n) at time DTS(n).

FIG. 8 is used to explain this first method. In this case, in order to make Oe(n) the bit occupation amount of the encoder buffer at time ETS(n) of FIG. 8, it is necessary that the rate controller 55 of FIG. 7 adjust the bit amount to be assigned for the preceding pictures.

In this case, it is possible to determine beforehand the moment of time t=a1 to change the output bit rate R from RX to RY in the encoder system as follows.

$\tau e(n)$=Oe/RX or $\tau e(n)$=$\tau$−Od($n$)/RY $\alpha 1$=ETS($n$)+$\tau e(n)$        Equation (1-3)

The encoder buffer size B in the interval $(\alpha 1-\tau) < t < \alpha 1$ can be determined as follows.

$x$=$t$−($\alpha 1-\tau$)

B=BX×($\tau$−$x$)/$\tau$+BY×$x$/$\tau$        Equation (1-4)

Thus, in this first method, it is possible to determine beforehand the moment of time t=$\alpha 1$, and accordingly to determine the output bit rate R at time t and the buffer size B which can be used. The same applies to the time interval $(\alpha 2-\tau) \leq t < \alpha 2$.

The second method is employed when a predetermined value is not assumed for the bit occupation amount Oe(n) of the encoder buffer immediately before encoding a picture A(n) at time ETS(n) (or the bit occupation amount Od(n) of the decoder buffer immediately before decoding the picture A(n) at time DTS(n)).

FIG. 9 shows an example for explaining this second method. Generally, this second case is considered to be used more often.

As shown in FIG. 9, in this second method, the following is assumed:

$\alpha 1$=ETS($n$)        Equation (1-5)

The encoder buffer size B during the time interval $(\alpha 1-\tau)$ $\leq t < \alpha 1$ is determined from Equation (1-4). The output bit rate R from the encoder buffer is changed from RX to RY at time t=$\alpha 1$ (ETS(n)).

Thus, in this second method, it is possible to determine the output bit rate R from the encoder buffer and the buffer size B. The same applies to the time interval $(\alpha b\ 2-\tau) \leq t < a2$.

When employing the method shown in FIG. 9, the rate controller 55 of FIG. 7 need not obtain the aforementioned bit occupation amount Oe(n) of the encoder buffer which is supplied to the output bit rate controller 56 and to the buffer size controller 57.

In FIG. 8 and FIG. 9, at time t, the code buffer size B which can be used in the encoder system and the output bit rate R can be described as follows.

do=(BX−b0)/RX: a delay time from ETS(0) to a start of the bit stream output from the encoder buffer.

R=RX: $0 \leq t < \alpha 1$

R=RY: $\alpha 1 \leq t < \alpha 2$

R=RZ: $\alpha 2 \leq t$

B=BX: $-\tau \leq t < (\alpha 1 - \tau)$

B=BY: $\alpha 1 \leq t < (\alpha 2 - \tau)$

B=BZ: $\alpha 2 \leq t$

The bit occupation amounts BX, BY and BZ can be calculated from the Equation (1-2). The values $\alpha 1$ and $\alpha 2$ and the code buffer size at time t in the ranges of $(\alpha 1 - \tau) \leq t < \alpha 1$ and $(\alpha 2 - \tau) \leq t < \alpha 2$ can be calculated by using one of the aforementioned two methods from the Equations (1-3) and (1-4) or Equations (1-5) and (1-4).

Assuming the aforementioned buffer model, the encoder system should carry out encoding while controlling not to overflow or underflow the decoder buffer. That is, the encoder system should control the rate controller 55 so that the stepped trace of the decoder system at time t will not exceed the decoder buffer size B, i.e., will be between the broken line e–f–g–h and the broken line i–j–k–l.

The encoder system encodes a k-th picture A(k), assuming a state of decoder bit occupation amount when the picture A(k) is decoded. Here, the bit amount generated by the k-th picture A(k) (i.e., size of the A(k)) should satisfy the following condition.

[Equation 2]
When k=0, $$Od(0) = b0 \qquad \text{Equation (1-6)}$$

When $k \geq 1$, $$Od(k) = b0 + \sum_{i=0}^{k-1}(DTS(i+1) - DTS(i)) \times R - \sum_{i=0}^{k-1} A(i) \qquad \text{Equation (1-7)}$$

$$Od(k) + R \times (DTS(k+1) - DTS(k)) - B \leq A(k) \leq Od(k) \qquad \text{Equation (1-8)}$$

wherein $A(k) \geq 0$

Here, R is the input bit rate to the decoder buffer 27 at time t, and B is the necessary size for the decoder buffer at time t.

Note that if there is no problem of underflow of the encoder buffer, the Equation (1-8) can be replaced by Equation (1-9).

$$A(k) \leq Od(k) \qquad \text{Equation (1-9)}$$

wherein $A(k) \geq 0$ and $0 \leq Od(k) < B$.

When using this equation (1-9), if the output bit rate from the encoder buffer 53 of FIG. 7 is less than the specified R, the multiplexer 54 carries out bit stuffing so as to increase the output bit rate to R.

The input bit rate R to the decoder buffer at time t is identical to the output bit rate from the encoder buffer at time (t−D0). Therefore, the following are satisfied.

R=RX: $D0 \leq t < \alpha 1 + Do$

R=RY: $\alpha 1 + D0 \leq t < \alpha 2 + D0$

R=RZ: $\alpha 2 + D0 < t$

Moreover, the size B required for the decoder buffer at time t is identical to the size used for the code buffer of the encoder system at time t−(D0+τ). Therefore, the following are satisfied.

B=BX: $D0 \leq t < (\alpha 1 + D0)$

B=BY: $(\alpha 1 + D0 + t) \leq t < (\alpha 2 + D0)$

B=BZ: $(\alpha 2 + D0 + t) \leq t$

The values $\alpha 1$ and $\alpha 2$ can be determined by any one of the aforementioned two methods, respectively from Equation (1-3) and Equation (1-5).

The size B required for the decoder buffer in the time interval $(\alpha 1 + D0) \leq t < (\alpha 1 + D0 + \tau)$ can be calculated as follows corresponding to the aforementioned two methods.

$x = t - (\alpha 1 + D0)$ $B = BX \times (\tau + x)/\tau + BY \times x/\tau$

The size B for the time interval $(\alpha 2 + D0) \leq t < (\alpha 2 + D0 + \tau)$ can be calculated in the similar manner.

For simplification, it is possible to assume D0=0. Then, the bit stream input to the decoder buffer can be considered, starting at t=0, and the time handling is simplified.

In the encoder system of FIG. 7, the picture A(i) when i<k corresponds to a signal S62. The rate controller 55 assumes S61 as the bit amount assigned for the k-th picture A(k) and specifies a value which satisfies the condition of Equation (1-8) (size of k-th coded picture A(k)). By this control, encoding can be carried out without causing overflow or underflow of the decoder buffer.

Description will now be directed to operation of such an encoder with reference to FIG. 7.

In FIG. 7, a terminal 50 is supplied with the aforementioned coded bit rate RT which is supplied prior to the video sequence from the terminal 51.

The start controller 66 is supplied via the terminal 65 with the bit occupation amount b0 at a decoding start of the decoder buffer, the first coding bit rate RT (=RX), and the first decoder buffer size from the rate controller 55, and using these data calculates the output start delay time do as follows.

do=(BX−b0)/RX

The start controller 66 controls to start output of a coded signal with the delay of do from the encoding start.

The output bit rate controller 56 controls the encoder buffer 53 as follows. For example, if the coding bit rate RT=RX up to the (n−1)-th picture A(n−1) is to be changed to the bit rate RT=RY for the next picture A(n) and after, the time β to change the coding bit rate is determined so that the code buffer size B of the encoder buffer 53 is switched from BX to BY at time (β−τ). According to the first method shown in FIG. 8, the rate controller 55 supplies the buffer bit occupation amount Oe(n) immediately before encoding the picture A(n) at the aforementioned time ETS(n), according to which the time β is obtained as follows.

β=ETS(n)+Oe(n)/RX

According to the second method shown in FIG. 9, the time ETS(n) for encoding the picture A(n) is obtained as the time β.

The rate controller 55 is supplied with a code amount S62 from the video encoder 52, the output bit rate R from the output bit rate controller 56, and the decoder buffer size B from the buffer size controller 57, and according to the aforementioned VBV model, calculates a bit amount S61 to be assigned for the next picture to be coded, which amount is sent to the video encoder 52, so that no overflow or underflow of the decoder buffer of size B is caused. The buffer size B for this rate control is assumed to be BX at the beginning. The decoder buffer size B is then gradually reduced from BX to BY from time ($\beta-\tau$), i.e., the aforementioned time $\tau$ (=Rmax/Bmax) earlier than the coded rate switching time $\beta$, until the switching time $\beta$. At the switching time $\beta$ and after, the buffer size B is assumed to be BY for controlling the bit amount S61 to be assigned for coding in the video encoder 52 without causing overflow or underflow of the decoder buffer.

The technique according to the embodiment of the present invention as has thus far been described can be summed up as follows. When encoding and transmitting a digital signal at a variable bit rate, the size of a transmission buffer (encoder buffer 53) for temporarily storing the coded signal of the encoder system is controlled according to the coding bit rate. The transmission buffer is provided with a code buffer used for rate control in the encoder system. The size of this code buffer is determined according to the reception buffer size of the decoder system, the maximum value of the coding bit rate, and the current coding bit rate.

Here, the size B of the aforementioned code buffer of the transmission buffer is determined as follows assuming Bmax as the reception buffer size of the decoder system, Rmax as the maximum value of the coding bit rate, and RT as the current coding bit rate.

$$B = Bmax \times RT/Rmax$$

It is assumed that the size of the aforementioned code buffer of the transmission buffer is switched at ($\beta-\tau$), i.e., earlier by $\tau$ than the moment at time $\beta$ when the coding bit rate is changed, wherein $$t = Bmax/Rmax$$

The switching moment time $\beta$ of the code buffer size B of the transmission buffer can be determined by two methods. The first method determines the switching moment according to the time for encoding or decoding a picture immediately after the picture for which the coding bit rate is changed; the buffer occupation amount at that time; and the preceding coding bit rate before the bit rate change. The second method assumes the aforementioned moment of time $\beta$ the encoding time of a picture immediately after the picture for which the coding bit rate has been changed.

The encoder system according to the aforementioned embodiment has a merit that the transmission delay time between the encoder system and the decoder system is small. Consequently, the encoder system according to the present embodiment is especially effective for a case which requires a least amount of delay such as a news program.

It should be noted that the present invention is not limited to the aforementioned embodiments. For example, the digital signal is not limited to a video signal but can also be applied to an audio signal. The present invention can be modified in various ways within the scope of the invention.

In the coded signal transmission method and apparatus according to the present invention, the size of the transmission buffer for temporarily storing a coded signal in the encoder system is controlled according to the coding bit rate so that a digital signal is coded at a variable bit rate and transmitted from the encoder system (transmission side) to the decoder system (reception side) at a variable bit rate without causing overflow or underflow of the reception buffer of the decoder system, thus enabling to obtain a stable signal reproduction.

Control of this size of the transmission buffer can be carried out, for example, by modifying the code buffer size which can be used for the rate control by the encoder system according to the coding bit rate. Here, it is assumed that the code buffer is included in the transmission buffer. In this case, the code buffer size which can be used currently by the encoder system is determined by the reception buffer size, the maximum value of the coding bit rate, and the current coding bit rate of the decoder system.

In this example, a stable signal reproduction can be realized in response to the variable bit rate. Moreover, in this example, there is a merit that the delay time between the encoder system and the decoder system is small, which is especially effective when the least amount of delay is required such as in a news program.

What is claimed is:

1. A coded signal transmission method for coding and transmitting a digital signal at a variable bit rate, comprising the step of:

controlling a size of a transmission buffer for temporarily storing a coded signal according to a coding bit rate;

determining an assigned bit amount of a subsequent picture to be coded in accordance with a bit amount of a coded picture generated from an encoder; and determining an output bit rate based on said coding bit rate;

wherein said step of controlling said size of said transmission buffer includes the step of varying the transmission buffer size based on the output bit rate and the assigned bit amount.

2. The method of claim 1 wherein said transmission buffer has a code buffer to be used for rate control, the size of the code buffer being determined according to a reception buffer size of a decoder, a maximum value of a coding bit rate, and a current coding bit rate.

3. The method of claim 1 wherein a code buffer size B of the transmission buffer is determined by an equation below:

$$B = Bmax \times RT/Rmax$$

wherein Bmax is a reception buffer size of a decoder, Rmax is the maximum value of a coding bit rate, and RT is a current coding bit rate.

4. The method of claim 3 wherein said code buffer size of the transmission buffer is switched at a moment of time earlier by $\tau$ than a moment of time when the coding bit rate is changed.

5. The method of claim 4 wherein said switching moment of time $\alpha$ of the code buffer size of the transmission buffer is determined according to a time period to encode or decode a picture immediately after a picture when the coding bit rate is changed, a current buffer occupation amount at that time, and a preceding coding bit rate prior to the bit rate change.

6. The method of claim 4 wherein $\tau$ equals Bmax/Rmax.

7. The method of claim 2 wherein a code buffer size B of the transmission buffer is determined by an equation below:

$$B = Bmax \times RT/Rmax$$

wherein Bmax is a reception buffer size of a decoder, Rmax is the maximum value of a coding bit rate, and RT is a current coding bit rate.

8. The method of claim 7 wherein said code buffer size of the transmission buffer is switched at a moment of time earlier by τ than a moment of time when the coding bit rate is changed.

9. The method of claim 8 wherein said switching moment of time α of the code buffer size of the transmission buffer is determined according to a time period to encode or decode a picture immediately after a picture when the coding bit rate is changed, a current buffer occupation amount at that time, and a preceding coding bit rate prior to the bit rate change.

10. The method of claim 9 wherein τ equals Bmax/Rmax.

11. The method of claim 8 wherein τ equals Bmax/Rmax.

12. The method of claim 5 wherein τ equals Bmax/Rmax.

13. A coded signal transmission apparatus for coding and transmitting a digital signal at a variable bit rate, comprising:

a transmission buffer;

a first controller for controlling a size of a code buffer for temporarily storing a coded signal in said transmission buffer so as to control a transmission bit rate according to a reception buffer size of a decoder, a maximum value of a coding bit rate, and a current coding bit rate, the first controller configured to generate an output bit rate based on said coding bit rate; and a second controller for inputting a bit occupation amount of the code buffer and receiving a bit amount of a coded picture generated from an encoder to calculate an assigned bit amount of a subsequent picture to be coded;

wherein said transmission buffer size is configured to vary in accordance with the output bit rate and the assigned bit amount.

14. The apparatus of claim 13 wherein said transmission buffer has a code buffer to be used for rate control, the size of the code buffer being determined according to a reception buffer size of a decoder, a maximum value of a coding bit rate, and a current coding bit rate.

15. The apparatus of claim 13 wherein said code buffer size B of the transmission buffer is determined by an equation below:

$$B = Bmax \times RT/Rmax$$

wherein Bmax is a reception buffer size of a decoder, Rmax is the maximum value of a coding bit rate, and RT is a current coding bit rate.

16. The apparatus of claim 15 wherein said code buffer size of the transmission buffer is switched at a moment of time earlier by τ than a moment of time when the coding bit rate is changed.

17. The apparatus of claim 16 wherein said switching moment of time α of the code buffer size of the transmission buffer is determined according to a time period to encode or decode a picture immediately after a picture when the coding bit rate is changed, a current buffer occupation amount at that time, and a preceding coding bit rate prior to the bit rate change.

18. The apparatus of claim 16 wherein τ equals Bmax/Rmax.

19. The apparatus of claim 14 wherein said code buffer size B of the transmission buffer is determined by an equation below:

$$B = Bmax \times RT/Rmax$$

wherein Bmax is a reception buffer size of a decoder, Rmax is the maximum value of a coding bit rate, and RT is a current coding bit rate.

20. The apparatus of claim 19 wherein said code buffer size of the transmission buffer is switched at a moment of time earlier by τ than a moment of time when the coding bit rate is changed.

21. The apparatus of claim 20 wherein said switching moment of time α of the code buffer size of the transmission buffer is determined according to a time period to encode or decode a picture immediately after a picture when the coding bit rate is changed, a current buffer occupation amount at that time, and a preceding coding bit rate prior to the bit rate change.

22. The apparatus of claim 21 wherein τ equals Bmax/Rmax.

23. The apparatus of claim 20 wherein τ equals Bmax/Rmax.

24. The apparatus of claim 13 wherein said code buffer size of the transmission buffer is switched at a moment of time earlier by τ than a moment of time when the coding bit rate is changed.

25. The apparatus of claim 24 wherein said switching moment of time α of the code buffer size of the transmission buffer is determined according to a time period to encode or decode a picture immediately after a picture when the coding bit rate is changed, a current buffer occupation amount at that time, and a preceding coding bit rate prior to the bit rate change.

26. The apparatus of claim 25 wherein τ equals Bmax/Rmax.

27. The apparatus of claim 24 wherein τ equals Bmax/Rmax.

* * * * *